United States Patent Office 3,264,362
Patented August 2, 1966

3,264,362
CONVERSION OF ALPHA TO BETA PINENE
USING DMSO-KOH CATALYST
Robert L. Webb, Orange Park, Fla., assignor to Union Bag-Camp Paper Corporation, New York, N.Y., a corporation of Virginia
No Drawing. Filed Oct. 22, 1965, Ser. No. 502,628
5 Claims. (Cl. 260—675.5)

This invention relates to a new and economical process for converting alpha pinene to beta pinene by heating the alpha pinene with a dimethyl sulfoxide solution of an alkali metal hydroxide at a temperature of 110–225° C. and thereafter separating the beta pinene by distillation.

Alpha pinene is frequently available in quantities in excess of demand. In contrast, beta pinene is usually in strong demand and short supply. There is a need for an economical process for isomerizing alpha pinene to beta pinene, but there is no prior art or literature which teaches the conversion of alpha pinene to beta pinene.

All of the major domestic turpentines, such as gum, steam distilled wood and sulfate turpentine, are rich in alpha pinene content (60–70%) but are low in beta pinene content which limits recovery from the natural sources. Gum turpentine contains only about 30% beta pinene while steam distilled turpentine contains almost no beta pinene. Sulfate turpentine average only about 20% beta pinene and is a poor source for large quantities of this material.

Demand for beta pinene has increased strongly in recent years because of its unique properties which make it especially suitable as a starting material for terpene resins in pressure sensitive tape and for the manufacture of aromatic chemicals for the perfumery industry. There is a real need for a new synthetic route for converting alpha pinene to beta pinene.

The catalyst system and the pinene is not miscible cold and only slightly miscible hot. At the end of the conversion it suffices to separate the lower dimethyl sulfoxide-alkali phase and fractionate the pinenes. Any dimethyl sulfoxide present in the separated pinene phase azeotropes with the alpha pinene and may be recycled to the isomerization vessel. Alternately, the separated isomerized pinene mixture may be washed with water to remove all traces of dimethyl sulfoxide and alkali prior to fractionation, if desired.

It is an object of this invention to provide an efficient and simple process for isomerizing alpha pinene to beta pinene which will produce pure beta pinene product without need for expensive catalysts or complex equipment and without the production of unwanted by-products.

It is a further object to provide a process for beta pinene manufacture from alpha pinene in liquid phase isomerization reaction using dimethyl sulfoxide as a liquid carrier for the alkali metal hydroxide which process is adapted by recovery, recycling and reuse to conserve the dimethyl sulfoxide liquid and the catalyst.

Other and further objects of the present invention will appear from the more detailed description below.

In a preferred embodiment of the invention, alpha pinene is agitated with a solution of potassium hydroxide in dimethyl sulfoxide and at temperatures of about 140° C. to about 190° C. Temperature is not critical but the isomerization is quite slow at 110° C., for example twenty-four hours or more may be required for conversions to pinene mixtures containing 3% or more beta pinene. On the other hand, at 190° C. only a few minutes are required to attain such conversions. When the desired degree of isomerization is achieved, usually 4 to 6% beta pinene in the pinene mixture, the pinene and catalyst layers are separated and the pinene layer containing a few percent dimethyl sulfoxide is fractionated by distillation to recover the alpha pinene and dimethyl sulfoxide for recycle to a new isomerization and to recover the beta pinene product. The separated dimethyl sulfoxide-base catalyst layer is recycled with the recovered alpha pinene or fresh pinene. A suitable weight ratio of potassium hydroxide to dimethyl sulfoxide is about 1 to 4, but ratios of 4 to 1 and 1 to 25 have provided good conversions. The ratio of pinene to catalyst system (defined as a mixture of dimethyl sulfoxide and potassium hydroxide) is not critical since weight ratios ranging from 10 to 1 to 1 to 10 have provided good conversions. In general, we may prefer to employ ratios of 3 to 1 to 1 to 1.

The most satisfactory base is potassium hydroxide although lithium and sodium hydroxides are active in the catalyst and may be used. The dimethyl sulfoxide-potassium hydroxide catalyst system functions well even though water may get into the system through use of wet pinene, from the atmosphere, etc. Commercial potassium hydroxide contains an appreciable amount of water yet it is suitable as a component of the catalyst system. Larger amounts of water are objectionable partly because they reduce the reflux temperature of the pinene-catalyst mixture and thereby slow the reaction. While the presence of water is therefore not critical, I prefer to operate without a substantial amount of water; and if too much water is present, for instance enough to lower the reflux temperature of the system to 140° C. or below at atmospheric pressure, I may choose to remove it azeotropically until the reflux temperature is 144 to 150° C., or alternately, I may conduct the reaction at pressures above atmospheric pressure.

The equilibrium between alpha and beta pinene is a mixture of about 95% alpha pinene and 5% beta pinene, the exact equilibrium being dependent on temperature. This equilibrium can be produced with the catalyst system described herein, starting with either alpha or beta pinene, and therefore it is to be appreciated that when the isomerizate contains about 4% beta pinene the isomerization is approaching completion.

Example I below illustrates, in tabular form, the unique coaction of KOH and DMSO at an isomerization temperature of 150° C. to achieve conversion of 4–5% of the alpha pinene present to beta pinene.

Example I

Samples of pure alpha pinene were heated with dimethyl sulfoxide and potassium hydroxide at about 150° C., plus or minus 2° C., for various lengths of time. Pinene and catalyst layers were then separated and the pinene layer was analyzed for alpha and beta pinene.

TABLE I

| Terpenes, ml. | DMSO, ml. | KOH, gms. | Time, hours | Alpha Pinene, percent | Beta Pinene, percent |
|---|---|---|---|---|---|
| 100 Alpha pinene | 10 | 0 | 2 | 100 | 0 |
| Do | 10 | 2 | 4 | 97.27 | 2.73 |
| Do | 10 | 2 | 6 | 97.04 | 2.96 |
| Do | 10 | 2 | 7 | 96.99 | 3.01 |
| 200 Alpha pinene | 0 | 8 | 2 | 100 | 0 |
| Do | 25 | 8 | 1.5 | 97.2 | 2.8 |
| Do | 25 | 8 | 4.00 | 96.3 | 3.7 |
| Do | 25 | 8 | 5.00 | 95.7 | 4.3 |
| Do | 25 | 8 | 7.00 | 95.6 | 4.4 |
| 100 Alpha pinene | 100 | 8 | 2 | 96.04 | 3.96 |
| Do | 100 | 8 | 3 | 95.8 | 4.2 |
| Do | 100 | 8 | 6 | 95.8 | 4.2 |
| Do | 100 | 8 | 12 | 95.8 | 4.2 |
| 50 Alpha pinene | 100 | 8 | 2 | 95.55 | 4.45 |
| Do | 100 | 8 | 6 | 95.23 | 4.7 |

Example II

This example illustrates comparative conversions with NaOH and LiOH at 147° C. Alpha pinene containing 0.6% beta pinene was heated and agitated at reflux temperature with 25% of its weight of catalyst II, the catalyst II consisting of a mixture of 4 parts by weight of dimethyl sulfoxide with 1 part by weight of alkali metal hydroxide. After heating for a period, the samples were analyzed for their alpha and beta pinene content.

| Base | Time, hours | Temp., °C. | Alpha Pinene | Beta Pinene |
|---|---|---|---|---|
| Lithium hydroxide | 12 | 147 | 98.7 | 1.3 |
| Sodium hydroxide | 12 | 147 | 98.3 | 1.7 |
| Potassium hydroxide | 4 | 147 | 95.3 | 4.7 |

Example III

This example illustrates suitable time/temperature correlation for the achievement of substantial conversion of alpha pinene to beta pinene using a specific catalyst mixture. Alpha pinene was agitated with three times its volume of a catalyst produced by adding 1 part of potassium hydroxide to 6 parts of dimethyl sulfoxide. The mixture was pumped through a heated, agitated vessel held at different temperatures and using various holding times in the vessel. The products were separated from the catalyst system and the upper pinene layer was analyzed.

| Temperature, °C. | Time, hours at Temp. | Percent Alpha Pinene | Percent Beta Pinene |
|---|---|---|---|
| 160 | 0.8 | 97.6 | 2.4 |
| 160 | 1.1 | 97.2 | 2.8 |
| 175 | 0.4 | 96.1 | 3.9 |
| 175 | 0.7 | 95.9 | 4.1 |
| 190 | 0.10 | 96.3 | 3.7 |
| 195 | 0.10 | 96.2 | 3.8 |
| 205 | 0.05 | 96.4 | 3.6 |
| 205 | 0.30 | 94.9 | 5.1 |

Having thus disclosed the invention, what is claimed is:

1. A method for the conversion of alpha pinene to beta pinene comprising heating alpha pinene mixed with a dimethyl sulfoxide solution of an alkali metal hydroxide to a temperature of 110–125° C. to form beta pinene in the reaction mixture, separating the lower liquid phase containing the dimethyl sulfoxide and dissolved alkali metal hydroxide from the upper phase containing the beta pinene and the starting pinene material, and fractionally distilling the beta pinene to separate it from the products in the upper liquid phase.

2. A method as claimed in claim 1, wherein said alkali metal hydroxide is present in an amount varying from 4 parts per 1 part of dimethyl sulfoxide down to 1 part per 25 parts of dimethyl sulfoxide.

3. A method as claimed in claim 2, wherein said alkali metal hydroxide is potassium hydroxide.

4. A method as claimed in claim 2, wherein said alkali metal hydroxide is sodium hydroxide.

5. A method as claimed in claim 2, wherein said alkali metal hydroxide is lithium hydroxide.

No references cited.

DELBERT E. GANTZ, *Primary Examiner.*

G. E. SCHMITKONS, *Assistant Examiner.*